(12) United States Patent
Cho

(10) Patent No.: US 7,908,106 B2
(45) Date of Patent: Mar. 15, 2011

(54) APPARATUS FOR CORRECTING POSITION AND ATTITUDE INFORMATION OF CAMERA AND METHOD THEREOF

(75) Inventor: Seong-Ik Cho, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1503 days.

(21) Appl. No.: 11/285,529

(22) Filed: Nov. 21, 2005

(65) Prior Publication Data

US 2006/0146136 A1    Jul. 6, 2006

(30) Foreign Application Priority Data

Dec. 21, 2004 (KR) .......................... 10-2004-0109575
May 6, 2005 (KR) .......................... 10-2005-0037882

(51) Int. Cl.
*G06F 19/00* (2006.01)
*G06F 17/40* (2006.01)
(52) U.S. Cl. ............... 702/85; 73/1.75; 702/92; 702/94; 702/189
(58) Field of Classification Search ............ 73/1.01, 73/1.75, 1.76, 1.77, 1.78, 1.79, 865.9; 356/256, 356/614, 625, 634; 382/100, 103, 107, 181, 382/190, 276, 286, 289, 291, 325; 702/1, 702/85, 92, 93, 94, 97, 104, 127, 141, 150, 702/187, 189
See application file for complete search history.

(56) References Cited

U.S. PATENT DOCUMENTS

| | | | |
|---|---|---|---|
| 6,580,389 B2 | 6/2003 | Speyer et al. | |
| 6,594,600 B1 * | 7/2003 | Arnoul et al. | 702/94 |
| 7,446,768 B2 * | 11/2008 | Satoh et al. | 345/427 |
| 7,613,356 B2 * | 11/2009 | Uchiyama et al. | 382/271 |
| 2002/0004691 A1 | 1/2002 | Kinashi et al. | |
| 2003/0048357 A1 * | 3/2003 | Kain et al. | 348/144 |
| 2003/0080976 A1 * | 5/2003 | Satoh et al. | 345/629 |
| 2004/0090444 A1 * | 5/2004 | Satoh | 345/633 |
| 2004/0107072 A1 | 6/2004 | Dietrich et al. | |
| 2004/0257441 A1 * | 12/2004 | Pevear et al. | 348/144 |
| 2005/0008256 A1 * | 1/2005 | Uchiyama et al. | 382/291 |

FOREIGN PATENT DOCUMENTS

| | | |
|---|---|---|
| JP | 07-170443 | 7/1995 |
| JP | 2002-031528 | 1/2002 |
| JP | 2002-034055 | 1/2002 |
| KR | 1999-017936 | 3/1999 |
| KR | 2001-0041187 | 5/2001 |
| KR | 1020020056460 | 7/2002 |
| KR | 1020030005749 | 1/2003 |
| KR | 2003-0044685 | 6/2003 |
| KR | 1020040033359 | 4/2004 |
| KR | 10-2005-0025836 | 3/2005 |

* cited by examiner

*Primary Examiner* — Edward R Cosimano
(74) *Attorney, Agent, or Firm* — Blakely, Sokoloff, Taylor & Zafman LLP

(57) ABSTRACT

Provided is an apparatus for precisely correcting position and attitude information of a camera by analyzing image information received through a three line scanner in operation of the camera obtaining the position and attitude information from a Global Navigation Satellite System (GNSS) and an Inertial Navigation System (INS), and a method thereof. The method for correcting position and attitude information of a camera includes the steps of: a) calculating the position of the camera by using the GNSS; b) calculating the attitude of the camera by using the INS; c) generating the position and attitude correction information of the camera by analyzing an image received through a three line scanner mounted in the camera; and d) receiving a feedback of the position and attitude correction information in the GNSS and the INS.

12 Claims, 4 Drawing Sheets

APPARATUS FOR CORRECTING POSITION AND ATTITUDE INFORMATION OF CAMERA AND METHOD THEREOF

FIELD OF THE INVENTION

The present invention relates to an apparatus for correcting position and attitude information of a camera, and a method thereof; and, more particularly, to an apparatus for precisely correcting the position and attitude information of a camera by analyzing image information received through a three line scanner, which is mounted on the camera, in operation of the camera obtaining the position and attitude information from a Global Navigation Satellite System (GNSS) and an Inertial Navigation System (INS), and a method thereof.

DESCRIPTION OF RELATED ART

There are three methods to determine a position and an attitude of an observation apparatus, e.g., an artificial satellite, an aircraft and a vehicle, or a camera which is loaded in the observation apparatus. One method is to decide the position and attitude information of the observation apparatus by combining information coming from a Global Navigation Satellite System (GNSS) and an Inertial Navigation System (INS). Another method is to decide the position and the attitude of the observation apparatus by using a Global Positioning System (GPS), which is a kind of the GNSS, in a situation that the INS is not available, and analyzing the signal coming from a plurality of GPS satellites. The other method is to generate three-dimensional (3D) information of an object by analyzing an image received through a stereoscopic camera mounted on the GNSS and the INS.

Korean Patent Publication No. 1997-41019 entitled "Hybrid Navigation System" discloses a technology for determining a position and an attitude of a vehicle by combining the GNSS and the INS and indicating a present position of the vehicle through map matching of the result.

Korean Patent Publication No. 2000-85817 entitled "System for Determining Position and Attitude in Mobile Communication System Using GPS and INS" discloses a technology for determining a position and an attitude in a mobile communication by combining information received from a GPS sensor, an INS sensor and a dead-reckoning (DR) sensor.

Korean Patent Publication No. 2001-41187 entitled "Apparatus for Detecting 3D Position and Method thereof" discloses a technology for acquiring a 3D position and attribute information of an object by using a stereo image obtained through a digital video camera set up in a vehicle employing the GNSS and the INS.

Korean Patent Publication No. 2002-62417 entitled "Space Image Information System for Supporting Effective Save and Retrieval of Space Image" discloses a technology for generating information by applying internal and external orientation parameters to an acquired image by using the GNSS, the INS and a CCD camera.

U.S. Publication No. 2002/0004691 entitled "Attitude Determination and Alignment Using Electro-optical Sensors and Global Navigation Satellites" discloses a technology for predicting and inspecting a position and an attitude of a satellite by analyzing a signal coming from a plurality of GPS satellites and information received from a star sensor.

U.S. Pat. No. 6,580,389 entitled "Attitude Determination Using A Global Positioning System" discloses a technology for determining a position and an attitude of a vehicle by analyzing a signal coming from a plurality of GPS satellites.

However, the conventional technologies determine a position and an attitude of an observation apparatus by using information received from only the GNSS, or simultaneously using the GNSS and the INS. Therefore, the conventional technologies have a characteristic that precision of position information depends on precision of information acquired from the GNSS, and precision of attitude information depends on precision of information acquired from the INS.

Therefore, the conventional technologies have a problem that position information cannot be acquired if the time interval for obtaining position information is shorter than a predetermined time interval, which is limited by the GNSS. For example, since a GPS signal is generally provided at one second interval, the GPS can not calculate precise position information if the time interval is shorter than one second.

The conventional technologies also have a problem that the attitude information cannot be acquired if the time interval for acquiring the attitude information is shorter than a time interval which is limited by the INS.

The conventional technologies also have a problem that the precision of the position and the attitude is controlled by the performance of a related system, and additional information in the image information received from the camera, which is an observation apparatus connected to the GNSS and the INS, is not applied.

SUMMARY OF THE INVENTION

It is, therefore, an object of the present invention to provide an apparatus for precisely determining position and attitude information of a camera based on a scan line image information received through a three line scanner of the camera mounting a Global Navigation Satellite System (GNSS) and an Inertial Navigation System (INS), and a method thereof.

Other objects and advantages of the invention will be understood by the following description and become more apparent from the embodiments of the present invention, which are set forth hereinafter. It will be also apparent that objects and advantages of the invention can be embodied easily by the means defined in claims and combinations thereof.

In accordance with an aspect of the present invention, there is provided a method for correcting position and attitude information of a camera, including the steps of: a) calculating the position of the camera by using a Global Navigation Satellite System (GNSS); b) calculating the attitude of the camera by using an Inertial Navigation System (INS); c) generating the position and attitude correction information of the camera by analyzing an image received through a three line scanner mounted in the camera; and d) receiving a feedback of the position and attitude correction information in the GNSS and the INS.

In accordance with another aspect of the present invention, there is provided a position and attitude information correction apparatus of a camera that the GNSS and the INS are connected to generates the position and attitude correction information of the camera by analyzing the image received through a three line scanner equipped in the camera, and improves the precision of the position and attitude information of the camera by receiving a feedback of the position and attitude correction information in the GNSS and the INS.

The position and attitude information correction apparatus of a camera connected to the GNSS and the INS generates the position and attitude correction information of the camera by analyzing the image received through a three line scanner in the camera, and improves the precision of the position and attitude information of the camera by receiving a feedback of the generated position and attitude correction information in the GNSS and the INS.

Other objects and advantages of the present invention will become apparent from the following description of the embodiments with reference to the accompanying drawings. Therefore, those skilled in the art that the present invention is included can embody the technological concept and scope of the invention easily. In addition, if it is considered that detailed description on the prior art may blur the point of the present invention, the detailed description will not be provided herein. The preferred embodiments of the present invention will be described in detail hereinafter with reference to the attached drawings.

BRIEF DESCRIPTION OF THE DRAWINGS

The above and other objects and features of the present invention will become apparent from the following description of the preferred embodiments given in conjunction with the accompanying drawings, in which:

FIG. 1 is a block diagram showing a system that an image-based position and attitude correction apparatus in accordance with an embodiment of the present invention is applied to;

DETAILED DESCRIPTION OF THE INVENTION

Other objects and aspects of the invention will become apparent from the following description of the embodiments with reference to the accompanying drawings, which is set forth hereinafter.

Figure 1:
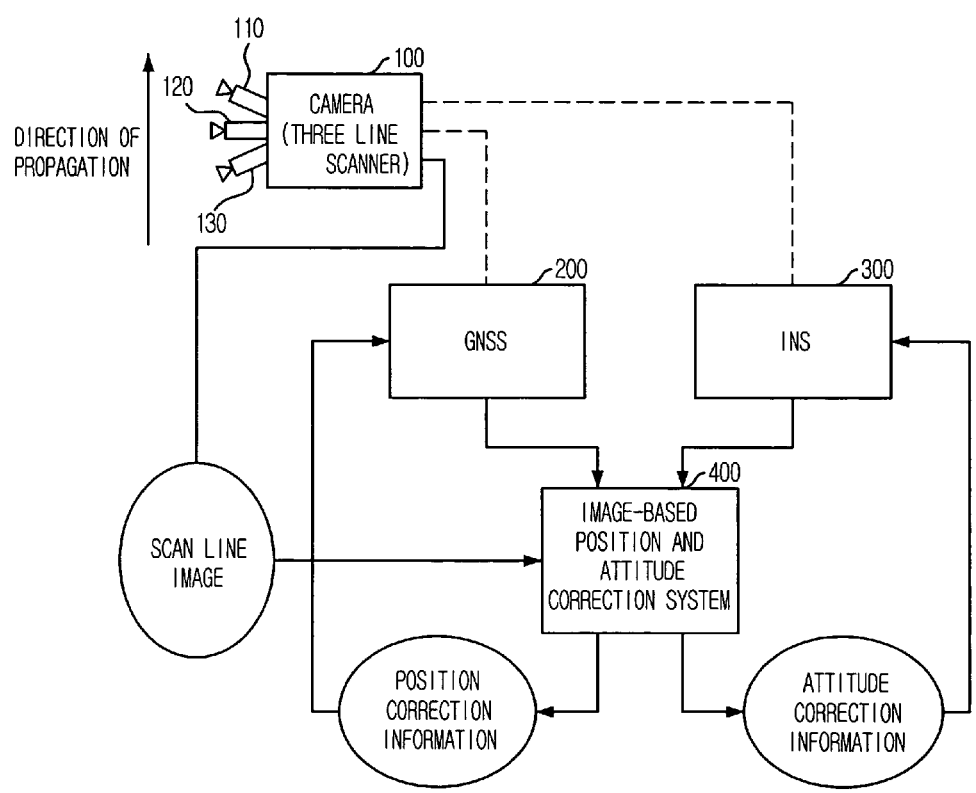

FIG. 1 is a block diagram showing a system which an image-based position and attitude correction apparatus in accordance with an embodiment of the present invention is applied to.

A camera 100 equipped with a three line scanner is mounted on an observation apparatus such as a satellite, an aircraft and a vehicle. Therefore, a position and attitude information of the camera 100 is directly connected with the position and attitude information of the observation apparatus.

The three line scanner includes a nadir scanner 120 toward a right angle direction from a propagation direction of the observation apparatus, a forward scanner 110 toward the direction of propagation, and a backward scanner 130 toward an direction opposite to the propagation direction. Herein, an angle between the nadir scanner 120 and the forward scanner 110, and the angle between the nadir scanner 120 and the backward scanner 130 are less than 90 degrees.

A Global Navigation Satellite System (GNSS) 200 connected to the camera 100 determines a position of the camera 100. A GPS receiver can be used as the GNSS 200. An Inertial Navigation System (INS) 300 connected to the camera 100 determines the attitude of the camera 100.

The GNSS and the INS are set up firmly and physically in the same frame as the camera 100. Since the common GNSS and INS can be used, detailed description on the structure will not be provided.

An image-based position and attitude correction apparatus 400 generates position and attitude correction information of the camera 100 based on a scan line image received through the three line scanner of the camera 100. The generated position and attitude correction information separately receives a feedback in the GNSS and the INS, and the position and attitude information of the camera 100 can be grasped more precisely.

Figure 2:
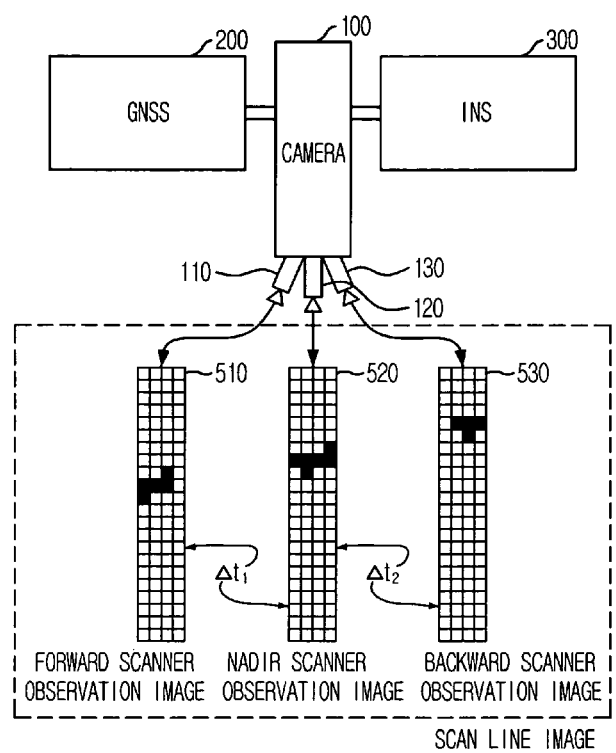
FIG. 2 is a block diagram showing a relationship between images acquired through a three line scanner in accordance with an embodiment of the present invention.

FIG. 2 is a block diagram showing a relationship between images acquired through a three line scanner in accordance with an embodiment of the present invention.

The three line scanner includes the forward scanner 110, the nadir scanner 120, and the backward scanner 130 according to the propagation direction of the observation apparatus. Therefore, the scan line image includes a forward scanner observation image 510 generated through the forward scanner 110, a nadir scanner observation image 520 generated through the nadir scanner 120, and a backward scanner observation image 530 generated through the backward scanner 130.

Since the three scanners are arrayed based on the propagation direction of the observation apparatus, a ground surface or a facility, which is an object of observation, is observed by the forward scanner 110. After a predetermined time $\Delta t_1$ passes, the observation object is observed by the nadir scanner 120, and after a predetermined time $\Delta t_2$ passes, the observation object is observed by the backward scanner 130.

When the observation apparatus is in a uniform straight-line motion and an inertia motion without changing the attitude, observation time intervals among the forward scanner 110, the nadir scanner 120 and the backward scanner 130 are the same, i.e., $\Delta t_1 = \Delta t_2$, and a position deviation between images, which are observed through three scanners 110, 120, and 130, does not appear. That is, a forward scanner observation image 510, a nadir scanner observation image 520, and a backward scanner observation image 530 are identified.

Meanwhile, when the observation apparatus is not in the uniform straight-line motion and the inertia motion, the position deviation appears among the images 510, 520 and 530 observed through the three scanners, just as in FIG. 2. The position deviation between the forward scanner observation image 510 and a nadir scanner observation image 520 is (1, 1) in a pixel unit, and the image position deviation between a nadir scanner observation image 520 and the backward scanner observation image 530 is (1, 2) in the pixel unit. An image-based position and attitude correction apparatus 400 of the present invention can precisely correct the position and attitude information of the camera by analyzing the image position deviation.

Figure 3:
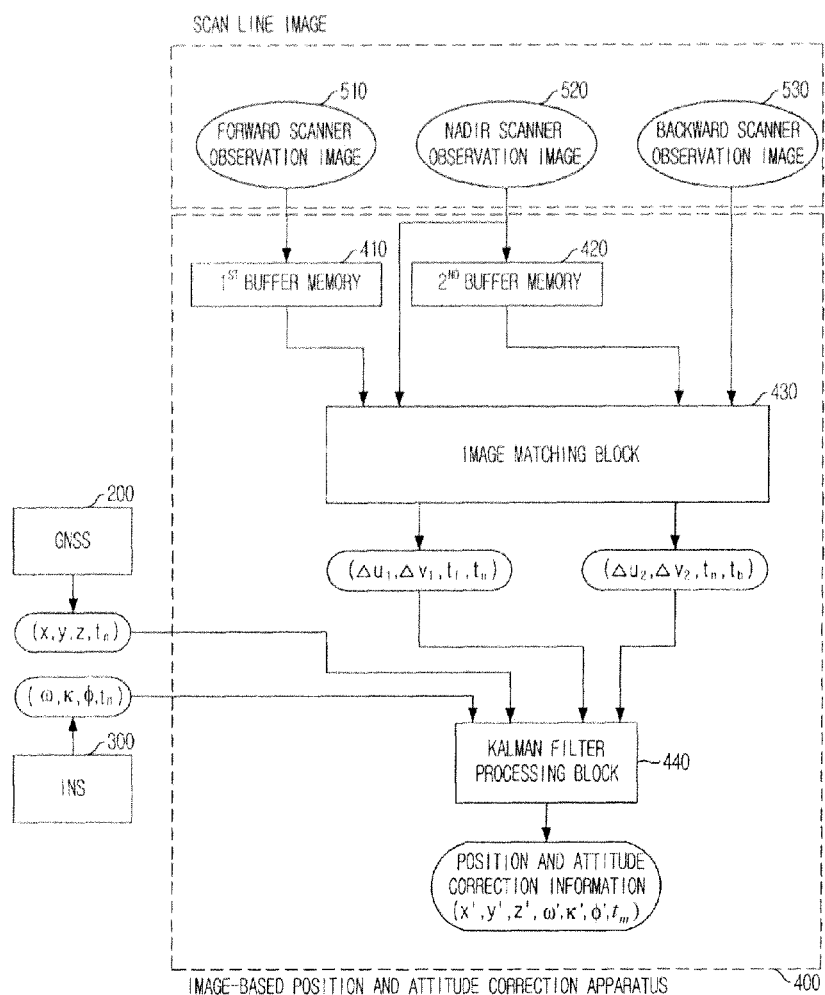
FIG. 3 is a block diagram illustrating an image-based position and attitude correction apparatus in accordance with an embodiment of the present invention.

FIG. 3 is a block diagram illustrating the image-based position and attitude correction apparatus 400 in accordance with an embodiment of the present invention.

If the observation apparatus employing the camera 100 equipped with the three line scanner progresses forward, the forward scanner observation image 510, the nadir scanner observation image 520, and the backward scanner observation image 530 are generated in order by the three line camera. The generated observation images 510, 520 and 530 are inputted to the image-based position and attitude correction apparatus 400.

The forward scanner observation image 510 is stored in a first buffer memory 410. Subsequently, an image matching block 430 performs an image matching on the temporarily stored forward scanner observation image 510 and the nadir scanner observation image 520, which is inputted by real-time observation through the nadir scanner 120, thereby calculating image position deviations $\Delta u_1$ and $\Delta v_1$ between two images 510 and 520 in the pixel unit. The image matching can be performed in well-known diverse methods including an area-based matching method and a feature-based matching method.

The same procedure can be applied to an image observed through the nadir scanner 120 and the backward scanner 130. That is, the nadir scanner observation image 520 is temporarily stored in a second buffer memory 420. Subsequently, the image matching block 430 performs the image matching on the temporarily stored nadir scanner observation image 520 and the backward scanner observation image 530 which is inputted by real-time observation through the backward scanner 130, thereby calculating image position deviations $\Delta u_2$ and $\Delta v_2$ between the images 520 and 530 in a pixel unit. The image matching can be performed in well-known diverse methods such as an area-based matching method and a feature-based matching method.

First image position deviation information $\Delta u_1$, $\Delta v_1$, $t_f$ and $t_n$ between the forward scanner observation image 510 and the nadir scanner observation image 520, and second image position deviation information $\Delta u_2$, $\Delta v_2$, $t_n$ and $t_b$ between the nadir scanner observation image 520 and the backward scanner observation image 530 are inputted to a Kalman filter processing block 440.

The first image position deviation information $\Delta u_1$, $\Delta v_1$, $t_f$ and $t_n$ include image position deviations $\Delta u_1$ and $\Delta v_1$ between the forward scanner observation image 510 and the nadir scanner observation image 520, a time $t_f$ that the forward scanner observation image 510 is generated, and a time $t_n$ that the nadir scanner observation image 520 is generated.

The second image position deviation information $\Delta u_2$, $\Delta v_2$, $t_n$ and $t_b$ include image position deviations $\Delta u_2$ and $\Delta v_2$ between the nadir scanner observation image 520 and the backward scanner observation image 530, a time $t_n$ that the nadir scanner observation image 520 is generated, and a time $t_b$ that the backward scanner observation image 530 is generated.

The Kalman filter processing block 440 presumes and generates the position and attitude correction information x', y', z', ω', κ', φ' and $t_m$ from the first and second image position deviation information, camera position information x, y, z and $t_n$ of time $t_n$, which is inputted from the GNSS 200, and the camera position information ω, κ, φ and $t_n$ of time $t_n$, which is inputted from the INS 300.

The position and attitude correction information has the camera position and attitude change which is sectionally calculated with respect to each time interval that the image is generated. Herein, time $t_m$ is any time existing between a time $t_f$ that the forward scanner observation scanner the image 510 is generated, and a time $t_b$ that the backward scanner observation image 530 is generated. The time interval that the image is generated can be shorter than the time interval limited by the common GNSS or INS.

Figure 4:
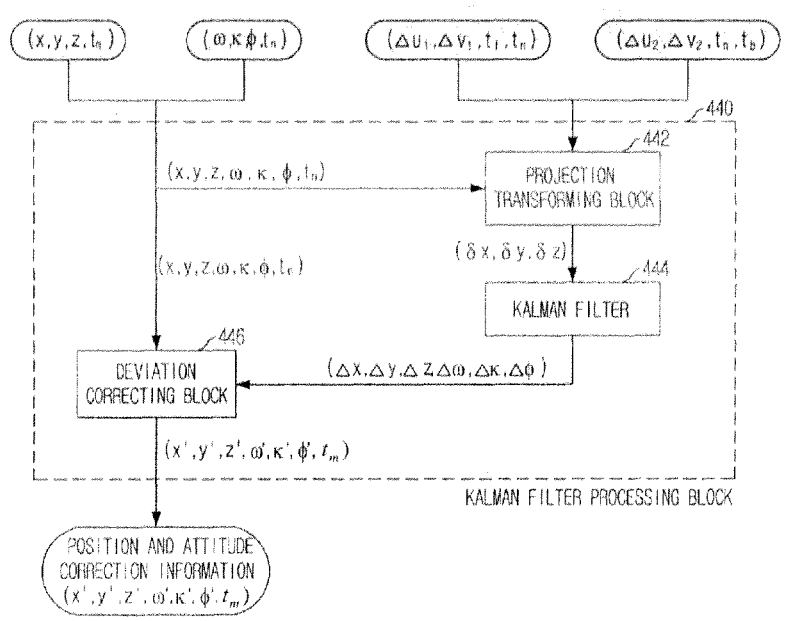
FIG. 4 is a block diagram illustrating a Kalman filter processing block in accordance with an embodiment of the present invention.

FIG. 4 is a block diagram illustrating a Kalman filter processing block 440 in accordance with an embodiment of the present invention. A projection transforming block 442 performs a projection transform applying 7 parameters x, y, z, ω, κ, φ and $t_n$ defined by the camera position information x, y, z and $t_n$, and the camera attitude information ω, κ, φ and $t_n$ to 7 parameters $\Delta u_1$, $\Delta v_1$, $\Delta u_2$, $\Delta v_2$, $t_f$, $t_n$ and $t_b$ defined by the first and second position information.

Parameters δx, δy and δz showing a real world position deviation are calculated by applying the performance result of the projection transform to parameters x, y and z showing the camera position information.

Subsequently, a Kalman filter 444 calculates parameters Δx, Δy, Δz, Δω, Δω and Δφ showing the estimated position and attitude deviation, which is optimized from parameters x, y, z, ω, κ, φ and $t_n$ showing the position and attitude information, and parameters δx, δy and δz showing the real world position deviation.

A deviation correction block 446 corrects a deviation of parameters x, y, z, ω, κ, φ and $t_n$ showing the position and attitude information by using parameters Δx, Δy, Δz, Δω, Δκ and Δφ showing the estimated position and attitude deviation, thereby outputting the position and attitude correction information x', y', z', ω', κ', φ' and $t_m$, which are optimized with respect to any time $t_m$.

The estimated position and attitude correction information x', y', z', ω', κ', φ' and $t_m$, which are optimized with respect to any time $t_m$ existing between $t_f$ and $t_b$, are divided into the position correction information x', y', z' and $t_m$ and the attitude correction information ω', κ', φ' and $t_m$. The GNSS 200 and INS 300 receives feedback separately for the divided position correction information and attitude correction information to precisely correct the position and attitude information of the camera.

The technology for improving the precision of the position and attitude information by receiving a feedback of the correction information received through the analysis of the three line scanner image can be proceeded by an onboard processing approach method and a post processing approach method.

The onboard processing approach method observes the image through the three line scanner in a satellite, an aircraft or a vehicle, improves the precision of the position and attitude information by receiving the feedback of the position and attitude correction information in the GNSS and the INS, and directly records the corrected position and attitude information in the image received through the three line scanner.

The post processing approach method records the original position and the attitude information received from the GNSS and the INS, and the image information received through the three line scanner, and improves the precision of the position and attitude information through a separate process later.

The present invention can be embodied as a program and stored in a computer-readable recording medium, such as CD-ROM, RAM, ROM, a floppy disk, a hard disk and a magneto-optical disk.

The present invention can precisely determine external orientation parameters of the camera without using a ground control point with respect to the image observed through the camera, which is mounted in a transporting means such as a satellite, an aircraft and a vehicle.

The present invention can also precisely determine the position and attitude information of the camera even when a time interval is short.

The present application contains subject matter related to Korean patent application Nos. 2004-0109575 and 2005-0037882, filed with the Korean Intellectual Property Office on Dec. 21, 2004, and May 6, 2005, respectively the entire contents of which is incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A method for correcting position and attitude information of a camera, comprising the steps of:
   a) calculating the position of the camera by using a Global Navigation Satellite System (GNSS);
   b) calculating the attitude of the camera by using an Inertial Navigation System (INS);

c) generating the position and attitude correction information of the camera by analyzing an image received through a three line scanner mounted in the camera; and d) feeding back the position and attitude correction information in the GNSS and the INS.

2. The method as recited in claim 1, wherein precision of the position and attitude information of the camera is controlled by using an onboard processing approach method or a post processing approach method.

3. The method as recited in claim 1, wherein the image received through the three line scanner includes a forward scanner observation image, a nadir scanner observation image, and a backward scanner observation image in the step c).

4. The method as recited in claim 3, wherein the step c) includes the steps of:

c1) calculating a first image position deviation by matching the forward scanner observation image and the nadir scanner observation image; and c2) calculating a second image position deviation by matching the forward scanner observation image and the nadir scanner observation image.

5. The method as recited in claim 4, wherein the step c) further includes the step of:

c3) applying a time point when the forward scanner observation image is generated, a time point when the nadir scanner observation image is generated, a time point when the backward scanner observation image is generated, the first and second image position deviation, and the position and attitude information of the camera in a time point when the nadir scanner observation image is generated, to a Kalman filter.

6. The method as recited in claim 4, wherein the image position deviation is calculated in a pixel unit.

7. An apparatus for correcting position and attitude information, comprising:

a camera connected to which the Global Navigation Satellite System (GNSS) and the Inertial Navigation System (INS) and receiving an image, wherein the position and attitude information correction apparatus generates the position and attitude correction information of the camera by analyzing the image received through a three line scanner equipped in the camera, and improves the precision of the position and attitude information of the camera by receiving a feedback of the position and attitude correction information in the GNSS and the INS.

8. The apparatus as recited in claim 7, wherein the three line scanner includes:

a nadir scanner toward a right angle direction from a propagation direction of the observation apparatus mounting the camera;

a forward scanner toward the propagation direction of the observation apparatus; and a backward scanner toward a direction opposite to the propagation direction of the observation apparatus, wherein an angle between the nadir scanner and the forward scanner and an angle between the nadir scanner and the backward scanner are less than 90 degree.

9. The apparatus as recited in claim 8, wherein the observation apparatus is one of a satellite, an aircraft and a vehicle.

10. The apparatus as recited in claim 8, further comprising:

an image matching means for matching an observation image of the forward scanner, which is stored in a first buffer memory, and an image received by real-time observation through the nadir scanner and matching an observation image of the backward scanner, which is stored in a second buffer memory, and an image received by real-time observation through the nadir scanner.

11. The apparatus as recited in claim 10, further comprising:

a Kalman filter processing means for generating the position and attitude correction information by applying the pixel-based image position deviation calculated in the image matching result to the Kalman filter.

12. The apparatus as recited in claim 11, wherein the Kalman filter processing means includes:

a projection transforming means for outputting a real deviation by projecting and transforming the position and attitude information of the camera, in a time point when the observation image of the nadir scanner is generated, into the image position deviation information;

a Kalman filter for computing the camera position and attitude information at a time point when the observation image of the nadir scanner is generated and an estimate with respect to the position and attitude deviation optimized from the real world position deviation; and a deviation correcting means for calculating the estimated position and attitude correction information, which is optimized at an arbitrary time between a time point when the observation image of the forward scanner is generated and a time point when the observation image of the backward scanner is generated.

* * * * *